United States Patent [19]

Goodrich et al.

[11] Patent Number: 5,028,642

[45] Date of Patent: Jul. 2, 1991

[54] DISCOLORATION-RESISTANT SPANDEX

[75] Inventors: Charles W. Goodrich, Waynesboro, Va.; William L. Evans, Turnersville, N.J.

[73] Assignee: E. I. du Pont de Nemours and Company, Wilmington, Del.

[21] Appl. No.: 477,738

[22] Filed: Feb. 9, 1990

Related U.S. Application Data

[63] Continuation-in-part of Ser. No. 277,840, Nov. 30, 1988, abandoned.

[51] Int. Cl.$^5$ .................. C08L 75/04; C08L 1/08; C08K 5/15
[52] U.S. Cl. ........................... 524/27; 524/56; 524/57; 524/58; 524/109; 524/432; 525/458
[58] Field of Search ...................... 524/56-58, 524/109, 432, 27; 525/458

[56] References Cited

U.S. PATENT DOCUMENTS

| | | | |
|---|---|---|---|
| 2,929,804 | 3/1960 | Steuber | 528/73 |
| 3,097,192 | 7/1963 | Schilit | 528/74 |
| 3,428,711 | 2/1969 | Hunt | 525/127 |
| 3,555,115 | 1/1971 | Bottomley et al. | 527/458 |
| 4,340,527 | 7/1982 | Martin | 524/432 |
| 4,374,237 | 2/1983 | Berger et al. | 528/38 |
| 4,499,221 | 2/1985 | Saitoh et al. | 524/109 |

FOREIGN PATENT DOCUMENTS 59-210970 1/1984 Japan .

Primary Examiner—John Kight, III
Assistant Examiner—P. Hampton-Hightower

[57] ABSTRACT

An improved spandex polymer composition provides fibers or films of the composition with increased heat set efficiency and greater discoloration resistance. The composition contains zinc oxide and a polyhydroxy additive selected from certain sugars, reduced sugars and/or polyhydroxy urethanes formed from these sugars or reduced sugars and an organic diisocyanate.

8 Claims, No Drawings

DISCOLORATION-RESISTANT SPANDEX

RELATED APPLICATION

This is a continuation-in-part of application Ser. No. 07/277,840, filed Nov. 30, 1988 abandoned.

BACKGROUND OF THE INVENTION

1. Field of the Invention

The present invention relates to stabilizers for spandex polymer which provide the polymer with improved resistance to discoloration induced by exposure to fumes and/or ultraviolet light. More particularly, the invention concerns sugars or sugar derivatives that not only provide such improved resistance but also provide improved heat-set efficiency to fibers made from the spandex polymer.

2. Description of the Prior Art

Spandex elastomeric fibers are made from long chain synthetic polymers comprised of at least 85% segmented polyurethanes. Many additives are known for stabilizing spandex polymers and fibers against discoloration. Antioxidants in the form of hindered phenols are well known and families of such compounds have been produced commercially under trade names such as "Cyanox" by American Cyanamid Co., "Irganox" by Ciba-Geigy Corp., "Wingstay" by Goodyear Chemical Co. "Santowhite" by Monsanto Co., "Ethanox" by Ethyl Corp. and the like. Additives for stabilization of the polymer against ultraviolet-light-induced degradation, such as "Tinuvin", are sold by Ciba-Geigy Corp. The addition of zinc oxide to stabilize spandex polymer against chlorine-induced degradation or discoloration is known from Martin, U.S. Pat. No. 4,340,527. Japanese Patent Application Publication 59-210970 discloses sucrose fatty acid esters as stabilizers for polyurethane compositions. Saitoh et al, U.S. Pat. No. 4,499,221 discloses sucrose monolaurate as an optional additive to enhance the effect of a polymeric amine stabilizer in a polyurethane composition and further notes at column 6, lines 30 ff, that the composition "may further comprise any other conventional additive(s) such as inorganic fine powders (e.g., barium sulfate, titanium dioxide, silicates, zinc oxide, zinc sulfide), . . . ".

The above-described stabilizers have been useful in improving the resistance of polyurethane polymers against discoloration induced by heat, ultraviolet light, fumes, chlorine and the like. However, we have found that other problems are encountered when sugar fatty acid esters are used in preparing dry-spun spandex fibers or in finishing and heat-treating fabrics containing such fibers. For example, when sucrose monolaurate is used as an additive, the spandex fibers discolor unacceptably when they are incorporated into a fabric which subsequently is subjected to a conventional heat setting treatment at a temperature between 150° and 200° C.

It is an object of this invention to improve the utility of spandex polymer by enhancing its stability with additives that do not cause significant detrimental effect on its other physical properties or on its spinning and finishing characteristics when the polymer is converted into fiber.

SUMMARY OF THE INVENTION

The present invention provides an improved spandex polymer composition which contains a zinc oxide additive in a concentration of 0.5 to 10%. The improvement of the present invention enhances the resistance of the polymer to discoloration by fumes and ultraviolet light. The improvement comprises a polyhydroxy additive in a concentration in the range of 0.5 to 5%, the percentages being based on weight of the polymer, the polyhydroxy additive being selected from the group consisting of sugars having the chemical formula $$C_x(H_2O)_y \qquad (I)$$

where x is 4, 5, 6, 12 or 18 and y is 4, 5, 6, 11 or 16, reduced sugars having the chemical formula $$C_zH_{2(z+1)}O_z \qquad (II)$$

where z is 4, 5 or 6, and low molecular weight polyhydroxy urethanes which are formed by the reaction of a large stoichiometric excess of the sugars (I) or reduced sugars (II) with an organic diisocyanate (i.e., excess of hydroxyl over isocyanate groups). The preferred concentration of the polyhydroxy additive is in the range of 1 to 3% and of the zinc oxide is in the range of 1 to 3%. Preferred polyhydroxy additives include (a) fructose or glucose, each of which is a sugar, (b) sorbitol or mannitol, each of which is a reduced sugar, and (c) the reaction product of sorbitol and tetramethylxylylene diisocyanate in about a 2.5:1 molar ratio. Preferred spandex polymer compositions also include a hindered phenolic antioxidant additive in a concentration in the range of 0.2 to 5%, preferably 0.5 to 3%. All concentrations are based on polymer weight.

DETAILED DESCRIPTION OF PREFERRED EMBODIMENTS

As used herein, the term "spandex" has its usual definition, as given above (i.e., a fiber made from a long chain synthetic polymer that comprises at least 85% by weight segmented polyurethane). The polyurethane has "soft segments" and "hard segments", which refer to specific portions of the polymer chain. The soft segments are the portions of the spandex polymer chain that can be derived from polyethers or polyesters. The hard segments are the portions of the spandex polymer chain that are derived from the reaction of an isocyanate and a diamine or diol chain extender. The isocyanate end group content of a polymer is referred to as NCO content. "Molecular weight" means number average molecular weight. "Low molecular weight" generally means a number average molecular weight of less than about 1,500. "Fiber" means staple fibers and continuous filaments.

In accordance with the present invention, sugars of Formula I above are useful in providing spandex-polymer with improved resistance to discoloration and/or degradation induced by ultraviolet light and/or by fumes. The sugar contain 4, 5, 6, 12 or 18 carbon atoms, preferably 5 or 6. The preferred 18-carbon-atom sugar is mannotriose. The preferred 12-carbon-atom sugar is sucrose. Suitable sugars having six carbon atoms include fructose, glucose, galactose and the like, with fructose and glucose being preferred. The preferred 5-carbon-atom sugar is xylose.

Reduced sugars (Formula II above) suitable for use in the present invention are prepared by reducing the aldehyde group or the ketone group of a sugar having five or six carbon atoms to a carbon having a hydroxyl group. A preferred reduced sugar having five carbon atoms is xylitol. Preferred six-carbon-atom reduced sugars are sorbitol and mannitol. Mannitol is especially preferred because of its greater resistance to extraction by water or cleaning solvent.

Polyhydroxy urethanes in accordance with the invention are prepared by reacting an excess of a sugar of Formula (I) or reduced sugar of Formula (II) with an organic diisocyanate, usually in a molar ratio of at least 1.5:1, preferably at least 1.8:1. The reaction product is a polyhydroxy urethane of low molecular weight having many unreacted hydroxyl groups. Molecular weight is usually less than 1,500. A molecular weight of less than 1,000 is preferred. Among the organic diisocyanates that are suitable for preparing the low molecular weight polyhydroxy polyurethanes are common commercial diisocyanates, such as hexamethylene diisocyanate ("HMDI"), p,p'-methylene diphenyl diisocyanate ("MDI"), 4,4'-methylene-bis(cyclohexylisocyanate) ("PICM"), isophorone diisocyanate ("IPDI"), and $\alpha,\alpha,\alpha',\alpha'$-tetramethyl-m-xylylene diisocyanate ("mTMXDI"). The preferred diisocyanate for use in preparing the polyhydroxy urethanes in accordance with the invention is mTMXDI. The reactions between the sugars or reduced sugars with the diisocyanate can be carried out in the presence or absence of solvent. However, use of a solvent, such as dimethylacetamide or dimethylformamide, is preferred, in which case a mixture of reactants and solvent is heated to a temperature in the range of 50° to 100° C. until all the isocyanate groups have been reacted. The solvent acts as a catalyst for the reaction. When the reaction is carried out with only the reactants, or in a solvent that is not a catalyst, small amounts of catalyst, such as dibutyltin dilaurate, may be added or a higher temperature can be employed to complete the reaction.

The polyhydroxy additives suitable for use in the present invention can also be employed as mixtures of the polyhydroxy additives.

To be effective in improving the resistance of the spandex polymer to discoloration and degradation due to exposure to fumes and/or light, the sugars, reduced sugars and/or polyhydroxy urethanes in accordance with the invention are present in a concentration of at least 0.5% based on the weight of the polymer. Concentrations of 5% or higher are rarely necessary to obtain the desired improvements in discoloration resistance and heat-set efficiency. Preferred concentrations are in the range of 1 to 3%.

In accordance with the present invention, the spandex polymer composition contains a zinc oxide additive. Usually, the zinc oxide is in the form of finely divided particles of high purity zinc oxide. Martin, U.S. Pat. No. 4,340,527, the entire disclosure of which is hereby incorporated herein by reference, describes such zinc oxide particles as being useful for improving the chlorine resistance of spandex fibers. Zinc oxide in the spandex polymer composition of the present invention greatly enhances the effect of the polyhydroxy additive in increasing the resistance of the spandex polymer to discoloration on exposure to fumes and/or ultraviolet light. Preferably, the zinc oxide has a purity of at least 99.4%, most preferably 99.7%, and is present in the spandex polymer in a concentration in the range of 0.5 to 10%, preferably 1 to 3%, by weight of the spandex polymer. An indication of zinc oxide purity is provided by its sulfur content. The high purity zinc oxide for use in the spandex polymer compositions generally has a sulfur content of no greater than 0.025% and preferably no greater than 0.005%.

In accordance with a preferred embodiment of the present invention, the polyhydroxy additive (i.e., sugar, reduced sugar and/or polyhydroxy urethane) and the zinc oxide additive are employed in the spandex polymer in combination with a hindered phenolic antioxidant. Hindered phenolic antioxidants are well known in the art and include, for example:

1,3,5-tris(4-t-butyl-3-hydroxy-2,6-dimethylbenzyl)-1,3,5-triazine-2,4,6(1H,3H,5H)trione ["Cyanox" 1790 sold by American Cyanamid Co.];

1,3,5-trimethyl-2,4,6-tris(3,5-di-t-butyl-4-hydroxybenzyl)benzene ["Ethanox" 330 sold Ethyl Corp.];

1,1-bis(2-methyl-4-hydroxy-5-t-butylphenyl)butane ["Santowhite" powder sold by Monsanto Co.];

a condensation product of p-cresol, dicyclopentadiene and isobutene ["Wingstay" L sold by Goodyear Chemical Co.];

and the like.

The concentration of the phenolic antioxidant in the spandex is usually in the range of 0.2 to 5%, preferably 0.5 to 2%, based on the weight of the spandex polymer.

Surprisingly, spandex polymer containing zinc oxide and polyhydroxy additives in accordance with the invention has a much greater resistance to discoloration than would have been expected from discoloration testing of spandex polymer samples that contained only one or the other of the carbohydrate or the zinc oxide. This combination of polyhydroxy additive and zinc oxide is believed to give a synergistic protection to the spandex polymer against discoloration. The improved resistance to discoloration persists even after fibers or films made with the spandex polymer composition have been scoured in an aqueous bath that would have been expected to remove the usually water-soluble sugars from the polymer. It was also surprising that these polyhydroxy additives proved to be highly non-extractable in aqueous and solvent baths of the type that fabrics made with spandex fibers usually are subjected to during commercial scouring and dyeing operations.

Conventional methods can be employed for adding the stabilizers and additives of the invention to the spandex polymer. For example, a concentrated slurry solution of the additives can be prepared in the same solvent as is used to prepare the spandex spinning solution. The concentrated slurry or solution can be added to the polymer solution prior to forming the polymer into articles, such as fibers or films.

The improved spandex polymer compositions of the invention are made from segmented polyurethanes, such as those based on polyethers, polyesters, polyesterethers and the like. Such spandex polymers are well known and can be prepared by methods such as those disclosed in U.S. Pat. Nos. 2,929,804, 3,097,192, 3,428,711, 3,533,290, and 3,555,115, among others. The compositions of the invention are most useful in polyether-based spandex.

The spandex polymer compositions of the invention may also contain a variety of other additives for other purposes. Among these other additives can be pigments or delustrants such as titanium dioxide, anti-tack agents or lubricants such as magnesium stearate and calcium stearate, whiteness enhancers such as ultramarine blue, dye enhancers such as DIPAM/DM (a copolymer of diisopropylaminoethyl methacrylate and n-decyl methacrylate), fillers such as talc, and the like, provided that the additional additives do not interfere with or detrimentally affect the polyhydroxy and zinc oxide additives required by the invention.

TEST PROCEDURES

The following procedures are used for measuring the various properties and parameters reported herein.

PREPARATION OF TEST SAMPLES

To determine the suitability of an additive for increasing the resistance of the spandex polymer to discoloration, samples of filaments and/or films of the polymer containing the additives are prepared for exposure tests.

For the film samples, a polymer solution is prepared substantially as described in the first paragraph of Example 1, below. Then, 220 grams of the polymer solution is thoroughly mixed with 20 grams of N,N-dimethylacetamide solvent containing the desired amount of test additive (e.g., 0.84 grams for 1% of additive based on the weight of the polymer). The polymer solution with additives is then allowed to remain undisturbed for 30 minutes. Then, films are cast on a "Mylar" polyester sheet. A doctor knife apparatus having a 0.020-inch (0.051-cm) wide gap is employed. Test samples measuring about 8 inches by 3.5 inches (20.3 cm by 8.9 cm) of N,N-dimethylacetamide solution are cast. After the cast films have been air-dried for 24 hours, the test samples are stripped from the "Mylar" sheet.

To prepare fiber samples, polymer solutions are prepared first in the same manner as described in the preceding paragraph. The required amount of additive (in N,N-dimethylacetamide) is added to the spinning solution and thoroughly mixed. Then the solution is dry-spun by conventional techniques into yarns of 40 or 70 denier (44 or 78 dtex). A test sample of the yarn is formed by winding the yarn at low tension on an aluminum card measuring 3 inches by 4 inches by 1/16 inch (7.6 cm×10.2 cm×0.16 cm) to give a layer of about ⅛-inch (0.32-cm) thickness.

After the film and yarn samples have been prepared, the samples are scoured in a solvent and/or aqueous bath. To simulate a solvent scouring bath, the film samples are immersed in 150 cm³ of "Perclene" tetrachloroethylene (sold by Diamond Shamrock Chemical Co., Irving, Tex.) for 30 minutes with occasional stirring and then dried in air for 4 hours before being "boiled off" (i.e., immersed in boiling water for 30 minutes) and used for testing. To simulate an aqueous scouring bath, the samples are immersed for an hour in a 80°-to-85° C. bath containing two liters of water in which are 8 grams of "Duponol" EP surface active agent (diethanolamine lauryl sulfate made by E. I. DuPont de Nemours and Company), 5 grams of tetrasodium pyrophosphate and 1.5 grams of ethylene diamine tetra-acetic acid. After removal from the bath, the samples are rinsed repeatedly in clear water until no trace of the bath additives is detectable in the rinse water.

DISCOLORATION MEASUREMENTS

Change in color of test samples is determined by the change in "b" values, which are measured by means of a differential color meter (Hunter Lab Color Quest 45/0, manufactured by Hunter Associates Laboratory, Inc., of Reston, Va.). The "b" values of samples before and after exposure are measured and the difference is reported as "Δb". Differences in Δb values are reported herein as δ(Δb) values.

RESISTANCE TO DISCOLORATION BY FUMES AND LIGHT

Resistance of a spandex sample to discoloration on exposure to nitrogen dioxide and ultraviolet light is measured with sample yarns wound on aluminum plates or on extracted/scoured film samples replaced on "Mylar" polyester film. The samples are exposed in a Scott Controlled Atmospheric Tester (SCAT). A flow of 2,760 cm³ of air and 42 cm³ of NO2 per minute is maintained while exposing the samples to light from a "daylight" fluorescent tube and four "black" fluorescent tubes (type F 30T8 and F 30T8 BL, respectively, made by General Electric Company). The SCAT tester is described in Technical Bulletin L-33 (published by the Textile Fibers Department Technical Service Section of E. I. DuPont de Nemours & Company, Wilminton, Del.). In the Examples below, this test is referred to as the "NO2/UV" test.

RESISTANCE TO ULTRAVIOLET LIGHT

To measure the resistance of spandex samples to discoloration on exposure to ultraviolet light alone, samples are exposed for 20, 40 and 60 hours in an Atlas Ci65 weather-o-meter. In the Examples and Tables below, this test is referred to as the "UV" test.

HEAT SET EFFICIENCY (HSE)

The ability to heat set a spandex sample is determined by measuring its heat set efficiency. In this test, six yarn samples, or six ⅛-inch (0.32-cm) wide film samples, are placed on a frame, drafted to 1.5 times their original length and then heated for 90 seconds at 195° C. The yarns, in a relaxed condition, are then immersed in boiling water for 30 minutes. This treatment in boiling water is sometimes referred to herein as a "boil off". The % HSE is defined as 100 times the final average length increase of the samples divided by one-half the initial length. Thus, $$\% \text{ HSE} = 100(L_f - L_i) \div 0.5 L_i,$$

where $L_f$ is the final length and $L_i$ is the initial length of the sample.

The invention is further illustrated by the following examples of preferred embodiments. These examples are included for the purposes of illustration and are not intended to limit the scope of the invention, which is defined by the appended claims. The reported results are believed to be representative, but do not constitute all the runs involving the indicated ingredients. In the examples, samples of the invention are designated with arabic numerals and comparison samples are designated with upper case letters.

EXAMPLE 1

This example demonstrates a clear advantage in resistance to fume-and-light-induced discoloration and in heat set efficiency of spandex fiber containing zinc oxide and a preferred reduced sugar additive according to the invention (Sample 1) over the same fiber from which the reduced sugar is omitted (Sample A).

A solution of segmented polyurethane in N,N-dimethylacetamide was prepared in accordance with the general procedure described in U.S. Pat. No. 3,428,711 (e.g., first sentence of Example II and the description of Example I). An intimate mixture was prepared of p,p'-methylenediphenyl diisocyanate and polytetramethylene ether glycol (about 1800 molecular weight) in a molar ratio of 1.63 and was held at a temperature of about 80° to 90° C. for 90 to 100 minutes to yield an isocyanate-terminated polyether (i.e., a capped glycol having 2.40% NCO content) which was then cooled to 60° C. and mixed with N,N-dimethylacetamide to provide a solution containing about 45% solids. Then while maintaining vigorous mixing, the capped glycol was reacted for 2 to 3 minutes at a temperature of about 75° C. with diethylamine and a 90/10 molar ratio of ethylenediamine and 1,3-cyclohexylenediamine chain extenders. The molar ratio of diamine chain extender to diethylamine was 6.3 and the equivalent ratio of diamine chain extenders to unreacted isocyanate in the capped glycol was 0.948. The resultant solution of segmented polyurethane contained approximately 36% solids and had a viscosity of about 2100 poises at 40° C.

Additives were dispersed in dimethylacetamide solvent and then thoroughly mixed with the polymer solution to give concentrations of 3% zinc oxide, 2% of DIPAM/DM (a 75/25 copolymer of diisopropylaminoethyl methacrylate and n-decyl methacrylate), 1.5% "Cyanox" 1790 hindered phenolic antioxidant (2,4,6-tris(2,6-dimethyl-4-t-butyl-3-hydroxybenzyl)isocyanurate), 0.01% silicone oil and about 1.5% sorbitol in the final fiber (without finish). All concentrations are based on the weight of the spandex polymer.

The above-described mixture and a mixture without sorbitol were dry spun through orifices in a conventional manner to form coalesced 4-filament, 40-denier yarns. The yarn containing sorbitol in accordance with the invention was designated Sample 1, and the comparison yarn with no sorbitol was Sample A. A surface lubricating finish of 91% polydimethyl siloxane, 5% polyamylsiloxane and 4% magnesium stearate was applied to the yarn. The yarn was wound on a plastic-coated cardboard tube. Test samples were rewound on aluminium cards and scoured in "Perclene" and aqueous baths. The changes in color (Δb) of the samples due to exposure in the $NO_2$/UV and UV testers are summarized in Table I.

The data in Table I demonstrate that the presence of a 1.5% concentration of sorbitol in the fiber drastically reduces light-induced discoloration in samples that had been scoured in solvent ("Perclene") or aqueous baths. In addition, the presence of sorbitol apparently provided a substantial increase in heat set efficiency.

TABLE I

|  | Sample 1 | | Comparison A | |
|---|---|---|---|---|
| Of Invention | yes | | no | |
| % HSE | 78.1 | | 66.6 | |
| Scouring bath | Solvent | Water | Solvent | Water |
| Color changes, "Δb" | | | | |
| 40-hour $NO_2$/UV test | 9.4 | 8.7 | 15.0 | 12.7 |
| 40-hour UV test | 4.5 | 5.3 | 8.0 | 9.9 |

EXAMPLE 2

This example illustrates the superior heat set efficiency and discoloration resistance of spandex polymer containing reduced sugars in accordance with the invention over such polymer in which a simple aldehyde is used instead of the reduced sugar.

Polymer solution was made as described in Example 1. Zinc oxide, DIPAM/DM and "Cyanox" 1790 were added to the solution in concentrations of 3%, 2% and 1.5%, respectively, based on the weight of the polymer. Another test additive was added to the polymer solution in a 2% concentration. Aldehydes and sugars were tested. Films were cast of the thusly prepared solutions and then given a solvent scour before testing.

Glyceraldehyde and malonaldehyde were found to discolor the solution during mixing; simple aldehydes did not reduce discoloration in the $NO_2$/UV test. In contrast, each of the tested aldoses, ketose and reduced sugar improved heat set efficiency and reduced discoloration in the 48-hour $NO_2$/UV exposure test. In addition, it was found that simple sugars improved whiteness retention more than did corn syrup (a mixture of six and 12 carbon sugars). Test results are summarized in Table II.

TABLE II

| Sample | Test Additive | % HSE | Initial "b" | $NO_2$/UV "Δb" (48 hr) |
|---|---|---|---|---|
| 2 | xylose (aldopentose) | 89.1 | 0.5 | 1.7 |
| 3 | mannose (aldohexose) | 89.1 | 1.3 | 2.2 |
| 4 | fructose (ketohexose) | 89.0 | 3.3 | 1.1 |
| 5 | sorbitol (reduced hexose) | 87.3 | 2.6 | 0.8 |
| 6 | corn syrup (mixed sugars) | 87.4 | 1.5 | 2.9 |
| B | glyceraldehyde (aldotriose) | 87.6 | 35.2* | * |
| C | butyraldehyde | 84.5 | 1.9 | 5.9 |
| D | malonaldehyde bis-diethylacetal | 84.4 | 9.4* | * |
| E | no test additive | 83.6 | 1.4 | 5.4 |

*Samples highly discolored.

EXAMPLE 3

This example shows the effect of corn syrup additive concentration on heat set efficiency and compares it to the the effect of a starch additive. For these tests, film samples were prepared as in Example 2, except that the concentration of sugar was different or starch replaced the sugar. The test results which are summarized in Table III show that, within the range of concentrations tested, (1) higher sugar concentrations generally lead to greater improvements in heat set efficiency and (2) starch additive has no positive effect on heat set efficiency.

TABLE III

| % carbohydrate Concentration | Heat Set Efficiency, % | |
|---|---|---|
| | Syrup | Starch |
| 0.0 | 83.7 | 83.7 |
| 0.5 | 85.9 | 83.8 |
| 1.0 | 86.7 | 84.0 |
| 2.0 | 88.0 | 81.5 |
| 4.0 | 87.7 | 82.8 |

EXAMPLE 4

This example further illustrates the effectiveness of sugars and reduced sugars in improving the heat set efficiency and discoloration of spandex polymers containing additives in accordance with the invention.

Film samples were prepared as in Example 2 except that the polyhydroxy additives of the invention differed from those of Example 2 or were comparison additives outside the invention. The concentration of the test additive was 2% based on the weight of the polymer. Table IV summarizes the results. Note that glycerol and pentaerythritol (Comparison Samples G and H, respectively) provided no significant protection against UV-light induced discoloration and had no effect on or were detrimental to heat set efficiency. Samples of the invention containing glucose (7), dl-threitol (10), xylitol (11) and mannitol (12) provided good protection against discoloration and high heat set efficiency. Of these, mannitol provided the highest heat set efficiency.

TABLE IV

Effect of Sugar and Reduced Sugars on Light Stability and % Heat-set Efficiency

| | | "Δb"* | |
|---|---|---|---|
| Test Sample | Percent HSE | NO$_2$/UV 40 hrs | UV 80 hrs |
| F. No polyhydroxy additive | 86.1 | 2.6 | 13.9 |
| 7. d-glucose (monosaccharide) | 92.1 | 1.9 | 10.6 |
| 8. Sucrose (disaccharide) | 91.1 | 2.4 | 11.3 |
| 9. Maltotriose (trisaccharide) | 89.1 | 2.6 | 13.1 |
| 10. dl-threitol (4-C polyol) | 87.6 | 0.9 | 9.9 |
| 11. xylitol (5-C polyol) | 88.9 | 1.0 | 9.5 |
| 12. mannitol (6-C polyol) | 92.5 | 0.8 | 10.6 |
| G. glycerol (3-carbon polyol) | 85.9 | 2.0 | 13.6 |
| H. pentaerythritol (4 primary hydroxyls) | ** | 2.2 | 13.8 |

*Color data after "Perclene" scour.
**Yarn broke in testing.

EXAMPLE 5

This example illustrates the advantageous use of typical hindered phenol antioxidants in combination with a sugar additive and zinc oxide in accordance with the invention.

Films were prepared as described in Example 2, with the additives of Example 2 except that the specific polyhydroxy additives and hindered phenol antioxidants listed in Table V were used in place of such additives of Example 2. The antioxidants listed in the table are (a) for comparison I and sample 13, "Cyanox" 1790, which is 1,3,5-tris(4-t-butyl-3-hydroxy-2,6-dimethylbenzyl)-1,3,5-triazine-2,4,6(1H,3H,5H)trione, (b) for comparison J and samples 14–15, "Santowhite" Powder which is 1,1-bis(2-methyl-4-hydroxy-5-t-butyl-phenyl)butane and (c) for comparison K and sample 16, "Wingstay" L, which is a condensation product of p-cresol, dicyclopentadiene and isobutene.

Table V shows that xylose and sorbitol in combination with zinc oxide are very effective in reducing light-induced discoloration in films containing "Santowhite" SWP and "Wingstay" L.

TABLE V

Test with Various Antioxidants

| | | | (Δb) | |
|---|---|---|---|---|
| Sample | Test Additives | HSE | NO$_2$/UV 40 hrs | UV 80 hrs |
| I | 1.5% Cyanox | 79.7 | 5.1 | 12.6 |
| 13 | 1.5% Cyanox + 2% xylose | 82.1 | 0.8 | 8.9 |
| J | 1% SWP | 81.3 | 9.1 | 10.7 |
| 14 | 1% SWP + 2% xylose | 83.3 | 1.4 | 4.8 |
| 15 | 1% SWP + 2% sorbitol | 87.0 | 1.3 | 3.9 |
| K | 1% Wingstay | 81.2 | 7.0 | 12.9 |
| 16 | 1% Wingstay + 2% xylose | 84.6 | 0.6 | 7.4 |

Notes:
All samples contain 3% ZnO and 2% DIPAM/DM (75/25).
Δb is measured after "Perclene" scour.
All % concentrations are by weight of the polymer.
Cyanox is "Cyanox" 1790.
SWP is "Santowhite" powder.
Wingstay is "Wingstay" L.

Tests, similar to those reported in the preceding paragraphs of this example, were performed with corn syrup as the polyhydroxy additive additive. "Cyanox" 1790, "Permanax" W80 (a high molecular weight phenolic antioxidant) and "Permanax" WSL antioxidant (a derivative of 4,6-dimethylphenol), the latter two antioxidants being sold by Vylnax, were employed as phenolic antioxidants. As shown by the results summarized in Table VI, polyhydroxy additives in combination with zinc oxide results in a large reduction in light-induced discoloration, even with Permanax antioxidants which usually were found to be among the phenolic antioxidants that were less effective than "Cyanox" for spandex fibers and films.

TABLE VI

Light Protection with Other Antioxidants

| | | 48-hour NO$_2$/UV (Δb) | |
|---|---|---|---|
| Sample | Test Additives | Not Scoured | Scoured |
| L | 1.5% Cyanox | 7.2 | 7.7 |
| 17 | 1.5% Cyanox + 2% corn syrup | 4.2 | 3.5 |
| M | 1% WS0 | 15.0 | 12.3 |
| 18 | 1% WS0 + 2% corn syrup | 6.6 | 4.3 |
| N | 1% WSL | 7.6 | 10.7 |
| 19 | 1% WSL + 2% corn syrup | 6.0 | 5.4 |

Notes:
All samples contain 3% ZnO and 2% DIPAM/DM (75/25).
Scour refers to a "Perclene" scour.
All % concentrations are by weight of the polymer.
Cyanox is "Cyanox" 1790.
WS0 is "Permanax" WSO.
WSL is "Permanax" WSL.

EXAMPLE 6

The beneficial effect of the combined zinc oxide and polyhydroxy additives in accordance with the invention in improving light stability is demonstrated by this example. Samples of 8-filament, 70-denier spandex fiber yarns, containing 1.5% "Cyanox" 1790, 2% DIPAM/DM and various concentrations of titanium dioxide (TiO$_2$) and zinc oxide (ZnO) particles, with or without a 2% concentration of sorbitol additive, were prepared by the general procedure of Example 1. The results of light exposure tests of the samples are summarized in Table VII. The results show that TiO$_2$ does not have much effect on light discoloration in contrast with ZnO which provides a significant improvement.

TABLE VII

Effects of TiO$_2$ and ZnO and Sorbitol on Light Stability

| | Percent Pigment | | | Initial | Δb | |
|---|---|---|---|---|---|---|
| Sample | TiO$_2$ | ZnO | Total | "b" | 20-hr. NO$_2$/UV | 40-hr. UV |
| O | 5 | 0 | 5 | −0.2 | 5.5 | 3.0 |
| P* | 5 | 0 | 5 | −0.2 | 5.1 | 2.9 |
| | | | | δ(Δb) = | −0.4 | −0.1 |
| Q | 4 | 1 | 5 | 0.1 | 5.7 | 3.6 |
| 20* | 4 | 1 | 5 | 0.1 | 5.3 | 2.4 |
| | | | | δ(Δb) = | −0.4 | −1.2 |
| R | 3 | 2 | 5 | −0.1 | 6.9 | 3.6 |
| 21* | 3 | 2 | 5 | −0.1 | 4.3 | 2.2 |
| | | | | δ(Δb) = | −2.6 | −1.4 |
| S | 1 | 3 | 4 | −0.8 | 7.6 | 4.0 |
| 22* | 1 | 3 | 4 | −0.8 | 4.5 | 2.4 |
| | | | | δ(Δb) = | −3.1 | −1.6 |
| T | 0 | 3 | 3 | −0.7 | 6.7 | 5.1 |
| 23* | 0 | 3 | 3 | −0.7 | 4.7 | 2.9 |
| | | | | δ(Δb) = | −2.0 | −2.2 |
| U | 0 | 2 | 2 | −0.5 | 7.7 | 6.0 |
| 24* | 0 | 2 | 2 | −0.5 | 7.1 | 4.8 |
| | | | | δ(Δb) = | −0.6 | −1.2 |
| V | 0 | 1 | 1 | −1.5 | 9.3 | 7.4 |
| 25* | 0 | 1 | 1 | −1.5 | 6.7 | 6.6 |
| | | | | δ(Δb) = | −2.6 | −0.8 |
| W | 0 | 0 | 0 | −0.8 | 6.7 | 10.3 |
| X* | 0 | 0 | 0 | −0.8 | 9.9 | 12.2 |

TABLE VII-continued

Effects of TiO₂ and ZnO and Sorbitol on Light Stability

| Sample | Percent Pigment TiO₂ | ZnO | Total | Initial "b" | Δb 20-hr. NO₂/UV | 40-hr. UV |
|---|---|---|---|---|---|---|
| | | | | δ(Δb) = | +3.2 | +1.9 |

Notes:
*Sample contains 2% sorbitol.
Color data were obtained on samples that had been subjected to an aqueous scouring.
δ(δb) = difference in δb between sample with and sample without sorbitol added.

EXAMPLE 7

This example shows the superior heat-set efficiency and discoloration resistance of spandex polymer containing polyhydroxy urethane additives in accordance with the invention over such spandex polymer without the polyhydroxy additive.

Polyhydroxy urethanes were prepared by reacting sorbitol in dimethylacetamide solution with different diisocyanates, in about a 2:1 mole ratio of sorbitol to diisocyanate, until the presence of unreacted isocyanate groups could no longer be detected. The polyhydroxy urethane products of the reactions were added to a spandex polymer spinning solution at a 1% concentration along with concentrations of 3% zinc oxide, 2% DIPAM/DM and 1.5% Cyanox® 1790, all the percentages being based on weight of spandex polymer. Spandex yarns of 44 dtex were then dry spun as described in Example 1. Results of exposure tests of the spun yarns are summarized in Table VIII. As shown by the Table VIII, Samples 26–30 of the invention had much better heat-set efficiency and discoloration resistance than Comparison Sample Y, which contained no polyhydroxy additive.

TABLE VII

Effect of Polyhdroxy Urethane Additive Derived from Sorbitol and Organic Diisocyante on % HSE and Discoloration Resistance

| Test Sample | Diiso-cyanate* | % HSE+ | Discoloration "Δb" | | | |
|---|---|---|---|---|---|---|
| | | | Perclean Scour | | Aqueous Scour | |
| | | | NO₂/UV | UV | NO₂/UV | UV |
| 26 | PICM | 81.5 | 5.8 | 7.0 | 5.7 | 8.4 |
| 27 | IPDI | 81.5 | 4.7 | 7.2 | 6.6 | 8.4 |
| 28 | mTMXDI | 83.0 | 6.6 | 6.1 | 5.7 | 8.4 |
| 29 | MDI | 82.0 | 7.1 | 5.9 | 6.7 | 8.4 |
| 30 | HMDI | 82.0 | 7.8 | 6.9 | 4.9 | 9.1 |
| Y | ** | 79.5 | 8.2 | 8.0 | 7.9 | 10.1 |

Notes
*Definition of diisocyanate abbreviations
PICM = 4,4'-methylene-bis(cyclohexyl) diisocyanate
IPDI = isophorone diisocyanate
mTMXDI = α,α,α',α'-tetramethylxylylene diisocyanate
MDI = p,p'-methylene-diphenyl diisocyanate
HMDI = hexamethylene diisocyanate
+Sample heat set for 120 seconds, instead of 90 sec.
**Comparison sample; contains no polyhydroxy urethane The results summarized in the preceding examples demonstrated the beneficial effects on UV-light resistance, fume resistance and heat set efficiency which result from adding a combination of polyhydroxy additives and zinc oxide to a spandex in accordance with the present invention. Although the inclusion of polyhydroxy additives (without zinc oxide) in spandex films and fibers can reduce UV-light-induced discoloration somewhat, the effect is much greater in the presence of zinc oxide. The combination also provides much more discoloration resistance than does zinc oxide (without polyhydroxy additive). Surprisingly, the improved discoloration resistance was retained even after the fiber or film had been subjected to an aqueous scour which would have been expected to remove the usually water-soluble sugars. This greatly enhances the utility of the invention because aqueous treatments, such as dyeing and scouring, are often employed with fabrics that contain spandex fibers. The results also showed that (a) monosaccharides perform better than polysaccharides, (b) six-carbon sugars perform much better than three-carbon compounds, and (c) reduced sugars, such as sorbitol or mannitol, and their urethane derivatives are preferred.

I claim:

1. An improved fiber of a polyether-based spandex polymer composition which contains a zinc oxide additive in a concentration of 0.5 to 10%, the improvement comprising a polyhydroxy additive in a concentration in the range of 0.5 to 5%, the percentages being based on weight of the polymer, the polyhydroxy additive being selected from the group consisting of sugars having the chemical formula $$C_x(H_2O)_y \qquad (I)$$ 

where x is 4, 5, 6, 12 or 18 and y is 4, 5, 6, 11 or 16,
reduced sugars having the chemical formula $$C_zH_{2(z+1)}O_z \qquad (II)$$ 

where z is 4, 5 or 6, and
low molecular weight polyhydroxy urethanes which are formed by the reaction of a large excess the sugars (I) or the reduced sugars (II) with an organic diisocyanate.

2. A fiber in accordance with claim 1 wherein the concentration of the polyhydroxy additive is in the range of 1 to 3% and the concentration of the zinc oxide is in the range of 1 to 3%.

3. A fiber in accordance with claim 1 wherein the polyhydroxy additive is a sugar selected from fructose and glucose.

4. A fiber in accordance with claim 1 wherein the polyhydroxy additive is a reduced sugar selected from sorbitol and mannitol.

5. A fiber in accordance with claim 1 wherein the polyhydroxy additive has a number average molecular weight of no more than 1,000 and is the reaction product of a reduced sugar and a diisocyanate selected from the group consisting of hexamethylene diisocyanate, p,p'-methylene-diphenyl diisocyanate, 4,4'-methylene-bis(cyclohexyl) diisocyanate, isophorone diisocyanate and α,α,α',α'-tetramethylxylylene diisocyanate.

6. A fiber in accordance with claim 5 wherein the reduced sugar is sorbitol.

7. A fiber in accordance with any of claims 1 through 6 wherein the composition contains a hindered phenolic antioxidant in a concentration in the in the range of 0.2 to 5% based on weight of the polymer.

8. A fiber in accordance with any of claims 1 through 6 wherein the composition contains a hindered phenolic antioxidant in a concentration in the in the range of 0.5 to 2% and the antioxidant is selected from the group consisting of 1,3,5-tris(4-t-butyl-3-hydroxy-2,6-dimethylbenzyl)-1,3,5-triazine-2,4,6(1H,3H,5H)trione, 1,3,5-trimethyl-2,4,6-tris(3,5-di-t-butyl-4-hydroxybenzyl)benzene, 1,1-bis(2-methyl-4-hydroxy-5-t-butylphenyl)butane, and a condensation product of p-cresol, dicyclopentadiene and isobutene.

* * * * *